(12) United States Patent
Zhou et al.

(10) Patent No.: US 10,466,136 B2
(45) Date of Patent: Nov. 5, 2019

(54) LEAK HOLE LEAK RATE DETECTION DEVICE AND METHOD

(71) Applicant: CITIC Dicastal CO., LTD, Qinhuangdao (CN)

(72) Inventors: Zhe Zhou, Qinhuangdao (CN); Jing Wang, Qinhuangdao (CN); Jinqi Lv, Qinhuangdao (CN); Guogang Chen, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 98 days.

(21) Appl. No.: 15/843,466

(22) Filed: Dec. 15, 2017

(65) Prior Publication Data

US 2019/0033161 A1 Jan. 31, 2019

(30) Foreign Application Priority Data

Jul. 31, 2017 (CN) .......................... 2017 1 06356244

(51) Int. Cl.
*G01M 3/26* (2006.01)
*G01M 3/00* (2006.01)

(52) U.S. Cl.
CPC .............. *G01M 3/26* (2013.01); *G01M 3/007* (2013.01)

(58) Field of Classification Search
CPC ................................ G01M 3/26; G01M 3/007
See application file for complete search history.

(56) References Cited

U.S. PATENT DOCUMENTS 3,987,664 A * 10/1976 Hass ................... G01M 3/3281
73/49.2

* cited by examiner

*Primary Examiner* — Paul M. West
(74) *Attorney, Agent, or Firm* — Calfee, Halter & Griswold LLP

(57) ABSTRACT

The present application provides a leak hole leak rate detection device and a method for implementing leak hole leak rate detection using the device. The device includes a gas storage tank, a valve, a leak hole, a latex sealing container, an electronic stopwatch and an electronic balance. The device can detect the leak rates of leak holes within a range of $1\times10^{-1}$~$1\times10^{-8}$ Pa·m$^3$/s, and has the characteristics of scientific detection principle, simple and reasonable structure and the like.

2 Claims, 1 Drawing Sheet

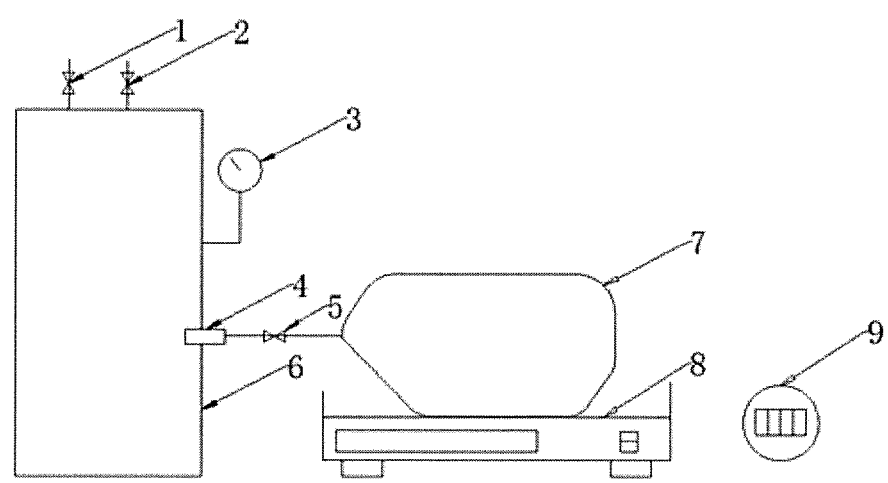

LEAK HOLE LEAK RATE DETECTION DEVICE AND METHOD

CROSS-REFERENCE TO RELATED APPLICATIONS

This application claims priority to Chinese Patent Application No. 2017106356244, filed on Jul. 31, 2017, which is hereby incorporated by reference in its entirety.

TECHNICAL FIELD

The present application relates to a leak hole leak rate detection device and method.

BACKGROUND ART

The leak hole leak rate detection device is a detection device special for detecting the leak rate of a leak hole, and belongs to the technical field of detection. Generally, the leak hole is made by adopting a metal flattening or metal capillary pore method; and the leak hole is mainly applied to verification of an air tightness detection system.

SUMMARY OF THE INVENTION

Thus, the aim of the present application is to provide a leak hole leak rate detection device, which can meet the requirement of common leak hole leak rate detection; and simultaneously, the present application desires to provide a leak hole leak rate detection method which is convenient to operate and high in efficiency.

In order to fulfill the above aim of the present application, the following technical solution is provided.

In an aspect of the present application, provided is a leak hole leak rate detection device, including a nitrogen gas source, an oxygen gas source, a gas storage tank, a pressure gauge, a leak hole, a valve, a latex sealing container, a balance and an electronic stopwatch.

In a preferred aspect of the present application, gases are mixed in a volume ratio of 79% and 21% by adopting an oxygen gas source valve and a nitrogen gas source valve in the detection device, and the obtained mixed gas that has a density the same with that of air is stable and is used as a detection medium; the detection medium is stored in the sealed gas storage tank, and the pressure gauge indicates gas pressure in the gas storage tank; the gas storage tank is provided with the leak hole, the leak hole is connected with the valve, the valve is connected with the latex sealing container, meanwhile, the latex sealing container is placed on the precision balance, and the electronic stopwatch is used for recording the time variation of detection.

In a preferred aspect of the present application, the oxygen gas source valve and the nitrogen gas source valve in the leak hole leak rate detection device are used for obtaining the mixed gas having the density the same with that of air as a detection medium, and simultaneously the pressure of the gas storage tank can be constantly kept at 0.2 MPa.

In a preferred aspect of the present application, the pressure gauge is adopted as a pressure indicator of the gas storage tank in the leak hole leak rate detection device, thereby facilitating calculation.

In a preferred aspect of the present application, the latex sealing container is adopted as a collection device of leak gas in the detection device, and is placed in air.

In a preferred aspect of the present application, the variation of gas volume in the latex sealing container with time can be calculated according to the reading change of the balance.

In a preferred aspect of the present application, the electronic stopwatch can accurately record the time variation.

In another aspect of the present application, a detection method for the leak hole leak rate detection device is provided, and the method includes the steps:

mixing oxygen and nitrogen in a volume ratio of 79% and 21% via the oxygen gas source valve and the nitrogen gas source valve to obtain a mixed gas that has a density the same with that of air and is stable as a detection medium, and storing the detection medium into the gas storage tank;

obtaining the pressure value in the gas storage tank via the pressure gauge, and keeping the pressure value constant at 0.2 MPa, the pressure value is greater than atmospheric pressure, so that high pressure gas can flow to air;

collecting leak gas to the latex sealing container via the leak hole and the valve mounted on the gas storage tank, and when the valve is opened, pressing the electronic stopwatch down to start timing, at the same time recording the atmospheric pressure and temperature of the environment of the detection device, the detection device is operated in a constant temperature environment, i.e., the environmental temperature is maintained at 23° C.±0.5□; and after gas enters the latex sealing container, reading the mass of the leak gas entering the latex sealing container from the balance with the accumulation of time, and obtaining the leak rate of the leak hole by calculation.

The technical solution of the present application has the following advantages: the device obtains a detection medium consistent with air in density, so the medium is easy to obtain and stable in performance; the pressure value in the gas storage tank may be accurately obtained by adopting the pressure gauge; the detection gas having the volume changed continuously may be collected by adopting the latex sealing container for calculation, and the mass of gas in the latex sealing container may be accurately obtained by adopting the balance.

BRIEF DESCRIPTION OF DRAWINGS

FIG. 1 is a structural schematic diagram of a leak hole leak rate detection device.

In FIGURES: 1—oxygen gas source valve, 2—nitrogen gas source valve, 3—pressure gauge, 4—leak hole, 5—valve, 6—gas storage tank, 7—latex sealing container, 8—balance, 9—electronic stopwatch.

DETAILED DESCRIPTION OF THE INVENTION

A leak hole leak rate detection device will be specified below in combination with the accompanying drawing.

Embodiment 1

A leak hole leak rate detection device includes an oxygen gas source valve 1, a nitrogen gas source valve 2, a pressure gauge 3, a leak hole 4, a valve 5, a gas storage tank 6, a latex sealing container 7, a balance 8 and an electronic stopwatch 9.

The leak rate of the leak hole 4 is generally $1\times10^{-1} \sim 1\times10^{-8}$ Pa·m³/s, and the detection device can realize detection within the range of the leak rate.

When 79% of nitrogen and 21% of oxygen are charged into the gas storage tank 6 via the nitrogen gas source valve 2 and the oxygen gas source valve 1, and the pressure value of the pressure gauge is stable at 0.2 MPa, the oxygen gas source valve 1 and the nitrogen gas source valve 2 are closed, wherein the valve 5 is closed during the charging process.

After the mixed gas is sufficiently mixed, the gas storage tank 6 stands 1 hour, at the moment, the detection device is kept in a constant temperature environment, and the temperature is controlled to 23° C.±0.5☐; meanwhile, the electronic balance 8 is turned on, and preheating is performed.

After 1 hour, the latex sealing container 7 is put on the electronic balance 8, the value $m_0$ is recorded, and the atmospheric pressure $p_{atm}$ in the detection environment is recorded at the same time; and then the valve 5 is opened; gas is charged into the latex sealing container 7 via the leak hole 4, and the electronic stopwatch 9 simultaneously begins timing.

Along with gas charging, the pressure of the gas storage tank 6 is kept at 0.2 MPa±0.01 MPa via opening the oxygen gas source valve 1 and the nitrogen gas source valve 2. During gas charging, the volume of the latex sealing container 7 may be changed, the mass $m_t$ of the latex sealing container 7 at a certain moment in the charging process is recorded, and the running time t of the electronic stopwatch is simultaneously recorded.

A detection method for the leak hole leak rate detection device is adopted. As mentioned in embodiment 1, after the leak hole to be detected is mounted on the gas storage tank and the detection medium in the gas storage tank is stable at 0.2 MPa, the electronic balance is started, the mass $m_0$ of the latex sealing container is measured, the mass $m_{24}$ of the latex sealing container is recorded when the running time reaches 24 hours, the environmental temperature a and the atmospheric pressure $p_{atm}$ are respectively recorded, and $Q_{PV}(24\ h)$ is solved; then other two 24-hour $Q_{PV}(24\ h)$ are operated, and the mean of three 24-hour leak rates is solved as the leak rate of the leak hole.

When the device of embodiment 1 of the present application is adopted for detecting the leak rates of 100 leak holes, compared with other similar devices, the results show that the errors between more than 98% of detection results and the detection results of other similar devices among 100 leak holes are within ±5%, so the device of embodiment 1 completely can meet the detection requirement.

As mentioned in embodiment 1, the detection parameters can be determined according to the detection environment and the detection requirement, generally, the environmental temperature is set at 23☐±0.5☐; the detection time is set at 24 hours; the number of detections is three to five, and the detection result is an arithmetic mean value; the rated pressure of the gas storage tank is 0.2 MPa±0.01 MPa; and the detection gases include 79% of nitrogen and 21% of oxygen.

It could be easily learnt by those skilled in the art that the detection accuracy of the leak hole leak rate detection device depends on two aspects, which are respectively pressure difference of two sides of the leak hole and environmental temperature; and the combination of said test devices can meet the requirements for detection of leak holes having different leak rates and detection accuracy.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A leak hole leak rate detection device, comprising an oxygen gas source valve, a nitrogen gas source valve, a pressure gauge, a leak hole, a control valve, a gas storage tank, a latex sealing container, an electronic balance and an electronic stopwatch, wherein that detection medium is a mixed gas of nitrogen and oxygen, and is controlled by the oxygen gas source valve and the nitrogen gas source valve; the leak hole is mounted on the gas storage tank, and the control valve is used for controlling access of leak gas; the latex sealing container is used for collecting leak gas passing through the leak hole, and the electronic balance is used for acquiring the mass change of the latex sealing container; and the electronic stopwatch is used for recording time, and the pressure gauge is mounted on the gas storage tank.

2. A detection method for the leak hole leak rate detection device of claim 1, comprising the steps of:
   mixing oxygen and nitrogen in a volume ratio of 21% and 79% via the oxygen gas source valve and the nitrogen gas source valve to obtain a mixed gas that has a density the same with that of air and is stable as a detection medium, and storing the detection medium into the gas storage tank;
   obtaining the pressure value in the gas storage tank via the pressure gauge, and keeping the pressure value constant at 0.2 MPa, the pressure value is greater than atmospheric pressure, so that high pressure gas can flow to air;
   collecting leak gas to the latex sealing container via the leak hole and the valve mounted on the gas storage tank, and when the valve is opened, pressing the electronic stopwatch down to start timing, at the same time recording the atmospheric pressure and temperature of the environment of the detection device, the detection device is operated in a constant temperature environment, i.e., the environmental temperature is maintained at 23° C.±0.5° C.; and
   after gas enters the latex sealing container, reading the mass of the leak gas entering the latex sealing container from the electronic balance with the accumulation of time, and obtaining the leak rate of the leak hole by calculation.

* * * * *